(12) United States Patent
Venkatachalam et al.

(10) Patent No.: US 8,811,947 B2
(45) Date of Patent: Aug. 19, 2014

(54) MANAGEMENT OF IDS FOR CLOSED SUBSCRIBER GROUP (CSG) BASE STATIONS

(75) Inventors: Muthaiah Venkatachalam, Beaverton, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 12/882,924

(22) Filed: Sep. 15, 2010

(65) Prior Publication Data
US 2011/0070867 A1 Mar. 24, 2011

Related U.S. Application Data

(60) Provisional application No. 61/243,951, filed on Sep. 18, 2009.

(51) Int. Cl.
*H04W 8/16* (2009.01)

(52) U.S. Cl.
USPC .......................................... 455/411; 370/338

(58) Field of Classification Search
USPC .......................................... 455/411; 370/338
See application file for complete search history.

(56) References Cited

U.S. PATENT DOCUMENTS

| | | |
|---|---|---|
| 2008/0043665 A1* | 2/2008 | Jeon et al. ..................... 370/328 |
| 2009/0086672 A1 | 4/2009 | Gholmieh et al. |
| 2009/0093232 A1 | 4/2009 | Gupta et al. |
| 2009/0104905 A1 | 4/2009 | DiGirolamo et al. |
| 2009/0238117 A1* | 9/2009 | Somasundaram et al. ..... 370/328 |
| 2009/0270092 A1* | 10/2009 | Buckley et al. ............... 455/434 |
| 2009/0280796 A1* | 11/2009 | Macaluso ...................... 455/419 |
| 2010/0027468 A1* | 2/2010 | Rajadurai et al. ............. 370/328 |
| 2010/0189070 A1* | 7/2010 | Shi et al. ....................... 370/331 |
| 2010/0291927 A1* | 11/2010 | Wu et al. .................... 455/435.3 |
| 2010/0302984 A1* | 12/2010 | Rege et al. .................... 370/312 |
| 2011/0149876 A1 | 6/2011 | Venkatachalam |
| 2011/0149878 A1 | 6/2011 | Ahmadi et al. |

FOREIGN PATENT DOCUMENTS

| | | |
|---|---|---|
| WO | 2011/035016 A2 | 3/2011 |
| WO | 2011/035016 A3 | 7/2011 |

OTHER PUBLICATIONS

Ahmadi et al., titled "Femtocell Discovery and Association in Cellular Networks", U.S. Appl. No. 12/646,560, filed Dec. 23, 2009, 21 pages.
Venkatachalam, Muthaiah, titled "Femtocell Architecture and Network", U.S. Appl. No. 12/645,045, filed Dec. 22, 2009, 18 pages.
International Preliminary Report on Patentability for PCT Patent Application No. PCT/US2010/049109, mailed on Mar. 29, 2012, 8 pages.
International Search Report and Written Opinion received for PCT Patent Application No. PCT/US/2010/049109, mailed on May 25, 2011, 9 pages.
Feng et al., "Femto AWD Text Proposal for 15.4.7 Network Entry", IEEE 802.16 Broadband Wireless Access Working Group, IEEE C802.16m-09/1750r5, Sep. 2, 2009, 4 pages.

(Continued)

*Primary Examiner* — Marcos Batista
(74) *Attorney, Agent, or Firm* — Kacvinsky Daisak Bluni PLLC (57) ABSTRACT

Embodiments of systems and methods for initiating network entry are generally described herein. Other embodiments may be described and claimed.

18 Claims, 4 Drawing Sheets

(56) References Cited

OTHER PUBLICATIONS

Srinivasan, Roshini, "IEEE 802.16m System Description Document (SDD)", IEEE 802.16 Broadband Wireless Access Working Group, IEEE 802.16m-09/0034, Jul. 27, 2009, 161 pages.

European Extended Search Report received for European Patent Application No. 10817821.1, mailed Oct. 30, 2013, 8 pages.
Huawei, "Discussion on CSG mobility list and TA list", 3GPP Draft; C1-083437, 3rd Generation Partnership Project (3GPP), Budapest Hungary Aug. 18-22, 2008; Mobile Competence Centre; 650 Route des Lucioles; F-06921 Sophia-Antipolis Cedex; France, 4 pages.

* cited by examiner

MANAGEMENT OF IDS FOR CLOSED SUBSCRIBER GROUP (CSG) BASE STATIONS

CLAIM OF PRIORITY

The present application claims priority to U.S. patent application No. 61/243,951 filed Sep. 18, 2009, the entire disclosure of which is hereby incorporated by reference in its entirety.

FIELD OF THE INVENTION

This application relates to wireless systems and, more particularly, to improving identification and selection of one or more base stations.

BACKGROUND

In wireless communications systems, a wireless device such as a mobile station (MS) usually performs network entry with an access point (AP) or base station (BS) to access a wireless network. The network entry procedure is established over a channel, or a primary carrier, with the AP.

Femto access points (FAP) such as WiMAX FAP (WFAP) are relatively low-power, low-cost, and low complexity cellular network WFAPs that are connected to a network service provider's core network through home, small office-home office (SOHO) and commercial environments. The WFAPs provide network access through a cell to an open group of users such as an open subscriber group (OSG) or closed group of users such as a closed subscriber group (CSG). The cell, such as a WiMAX femtocell, is a system comprising a WFAP and other additional network entities that provide network service to the MS through the WFAP.

Since the WFAPs can be densely deployed, use of typical cell search and cell selection methods which are used for initial network entry/re-entry or handover for AP or BS can be cumbersome, can add to overhead in system operations and can increase MS power consumption and complexity.

BRIEF DESCRIPTION OF THE DRAWINGS

The present invention is illustrated by way of example and not as a limitation in the figures of the accompanying drawings, in which.

DETAILED DESCRIPTION

In the following detailed description, numerous specific details are set forth in order to provide a thorough understanding of embodiments of the invention. However it will be understood by those skilled in the art that embodiments of the invention may be practiced without these specific details. In other instances, well-known methods, procedures, components and circuits have not been described in detail so as not to obscure embodiments of the invention.

Unless specifically stated otherwise, as apparent from the following discussions, it is appreciated that throughout the specification discussions utilizing terms such as "processing," "computing," "calculating," "determining," "investigating," "locating," "decoding," or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

The following detailed description describes various embodiments for initiating entry in a wireless network by a wireless device, platform, user equipment (UE), subscriber station (SS), station, mobile station (MS) or advanced mobile station (AMS). The various forms of devices described above such as the platform, UE, SS, MS, or AMS are generically referred to throughout the specification as a MS. The MS may initiate entry to a network with one or more devices or systems such as a base station (BS), advanced base station (ABS), access point (AP), node, node B, or enhanced node B (eNB), which are generically referred to throughout the specification as a BS. Further, these terms may be conceptually interchanged, depending on which wireless protocol is being used in a particular wireless network, so a reference to BS herein may also be seen as a reference to either of ABS, eNB, or AP as one example. Similarly, a reference to MS herein may also be seen as a reference to either of AMS, UE, or SS as another example. Wireless networks specifically include, but are not limited to, wireless local area networks (WLANs), wireless personal area networks (WPANs), and/or wireless wide area networks (WWANs).

The following inventive embodiments may be used in a variety of applications including transmitters and receivers of a radio system, although the present invention is not limited in this respect. Radio systems specifically included within the scope of the present invention include, but are not limited to, network interface cards (NICs), network adaptors, MS, BS, gateways, bridges, and hubs. Further, the radio systems within the scope of the invention may include cellular radiotelephone systems, satellite systems, personal communication systems (PCS), smartphones, netbooks, two-way radio systems, two-way pagers, personal computers (PCs) and related peripherals, personal digital assistants (PDAs), personal computing accessories and all existing and future arising systems which may be related in nature and to which the principles of the inventive embodiments could be suitably applied.

In the field of communications, including wireless communications, it would be helpful to provide an efficient approach for the management of base station identifiers (BSID)s, including BSs to communicate with MSs that belong to one or more types of open subscriber groups (OSGs) and/or closed subscriber groups (CSGs). The MSs communicate over one or more carriers in a wireless network, wherein the wireless network may comprise one or more macrocells, microcells, picocells, and/or femtocells, hereinafter referred to as a cell.

Communications may be initiated over a carrier such as a primary carrier. A primary carrier can be a carrier on which a BS and a MS exchange traffic and Physical layer (PHY)/ Media Access Control (MAC) layer control information. Further, the primary carrier can be used to communicate control functions for MS operation, such as network entry wherein each MS has a carrier that the MS considers to be its primary carrier in a cell. For communications already established over a primary carrier, a BS may prompt a MS to change from the primary carrier to a secondary carrier, thereby switching the primary carrier to another carrier.

In an embodiment, one or more femtocells are deployed wherein each femtocell is associated with one or more OSG and/or CSG of MS. A first femtocell is deployed wherein the first femtocell is provided by a first BS having a first BSID and wherein the first BS is positioned in a residential environment and the first BS is associated with a first CSG of one or more MS. Also, a second femtocell is also deployed wherein the second femtocell is provided by a second BS having a second BSID and wherein the second BS is positioned in a corporate environment and is associated with a second CSG of one or more MS. A MS proximate to the first BS and the second BS may also be near additional BS, wherein each BS has a unique BSID.

As the MS moves or changes location relative to the first BS and the second BS, the MS encounters additional BS(s) and the MS may want to associate and communicate with the one or more additional BS(s). To associate with the one or more additional BS(s), the MS may need to store a plurality of BSIDs correlating to one or more femtocells, depending on the MS subscription. Maintenance of a large number of BSIDs within the MS may delay entry to a targeted cell such as the first femtocell due to complexity created by the large number of BSIDs stored in the MS. The BSIDs may be provisioned in the MS by the manufacturer, added to the MS by a network service provider (NSP), and/or sent to the MS over-the-air by the NSP or another entity.

BSIDs may be provided to the MS by the NSP on a periodic basis using a broadcast message. Messages broadcast by the BS are transmitted on a periodic basis and the periods between transmissions may be long in duration, causing network entry latency for the MS. It would be helpful to provide systems and methods for the efficient management of BSIDs to improve an ability to initiate MS network entry with target BS(s) and to reduce latency related to network entry.

Figure 1:
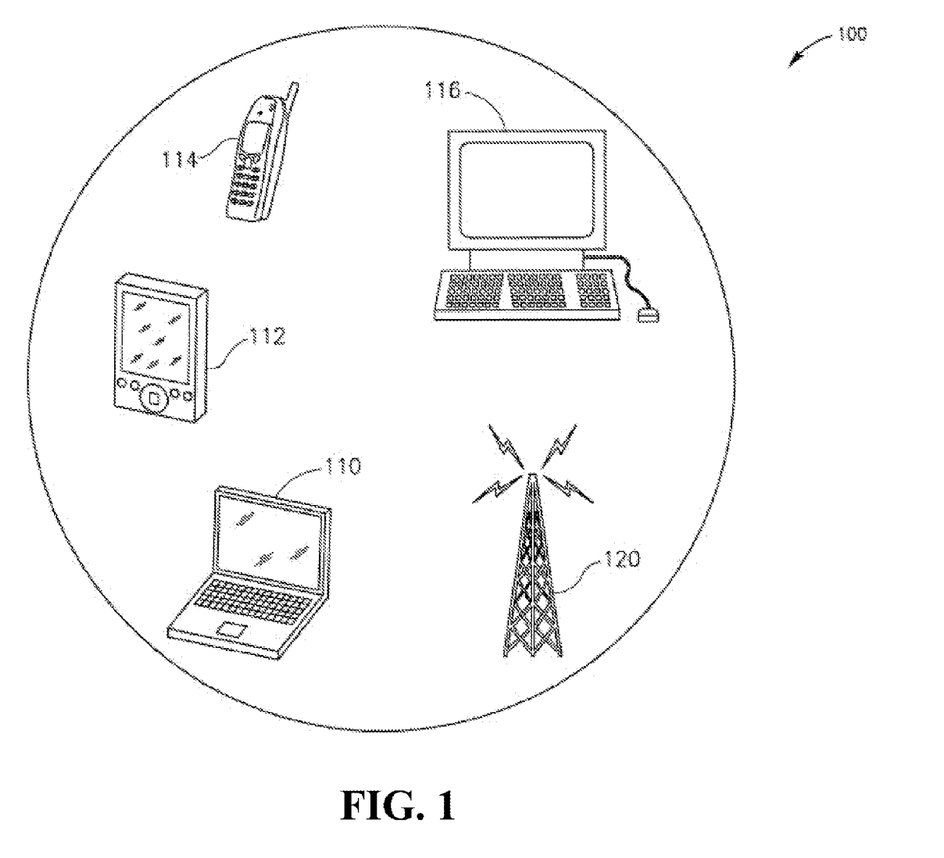
FIG. 1 is a block diagram that illustrates a wireless network according to some embodiments.

Reference is made to FIG. 1, which schematically illustrates a wireless network 100 according to embodiments of the invention. Wireless network 100 may include one or more BS 120, and one or more MS 110, 112, 114, and/or 116, which may be for example mobile or fixed stations. Reference herein to the MS 110 may represent stations 110, 112, 114, and/or 116. The terms base station and mobile station are used merely as an example throughout this specification and their denotation in this respect is in no way intended to limit the inventive embodiments to any particular type of network or communication protocol. The MS 110, 112, 114, and/or 116 may be configured for communication over a single carrier or over a plurality of carriers, including a primary carrier and one or more secondary carriers. The base station 120 may also be configured for communication over one or a plurality of carriers, such as in a multiple-input multiple-output (MIMO) configuration.

Wireless network 100 may facilitate wireless access between each of MS 110, 112, 114, and/or 116 and BS 120. For example, wireless network 100 may be configured to use one or more protocols specified in by the Institute of Electrical and Electronics Engineers (IEEE) 802.11™ standards ("IEEE Standard for Wireless LAN Medium Access Control (MAC) and Physical Layer (PHY) Specification. 1999 Edition", reaffirmed Jun. 12, 2003), such as IEEE 802.11a™-1999; IEEE 802.11b™-1999/Corl2001; IEEE 802. IIg™-2003; and/or IEEE 802.11n™, in the IEEE 802.16™ standards ("IEEE Standard for Local and Metropolitan Area Networks—Part 16: Air Interface for Fixed Broadband Wireless Access System", Oct. 1, 2004), such as IEEE 802.162004/Corl-2005 or IEEE Std 802.16-2009, which may herein be referred to as the "IEEE Std 802.16-2009" or "WiMAX" standards, and/or in the IEEE 802.15.1™ standards ("IEEE Standard for Local and Metropolitan Area Networks—Specific Requirements. Part 15.1: Wireless Medium Access Control (MAC) and Physical Layer (PHY) Specifications for Wireless Personal Area Networks (WPANs™), Jun. 14, 2005), although the invention is not limited in this respect and other standards may be used. In some embodiments, attributes, compatibility, and/or functionality of wireless network 100 and components thereof may be defined according to, for example, the IEEE 802.16 standards (e.g., which may be referred to as a worldwide interoperability for microwave access (WiMAX)). Alternatively or in addition, wireless network 100 may use devices and/or protocols that may be compatible with a 3rd Generation Partnership Project (3GPP), Fourth Generation (4G), Long Term Evolution (LTE) cellular network or any protocols for WLANs or WWANs.

Embodiments of the invention may enable the next generation of mobile WiMAX systems (e.g., based on IEEE 802.16m, IEEE 802.16e, or IEEE 802.16ac standards) to efficiently support substantially high mobility and low latency applications, such as, for example, Voice-over-Internet Protocol (VoIP), interactive gaming over the air-interface, deployment in larger cell-sizes or lower frequency bands, and/or "multi-hop" relay operations.

In some embodiments, the BS 120 may manage and/or control wireless communications among MS 110, 112, 114, and/or 116 and between MS 110, 112, 114, and/or 116 and the BS 120. Mobile stations 110, 112, 114, and/or 116 may, in turn, facilitate various service connections of other devices (not shown) to wireless network 100 via a private or public local area network (LAN), although the embodiments are not limited in this respect.

Figure 2:
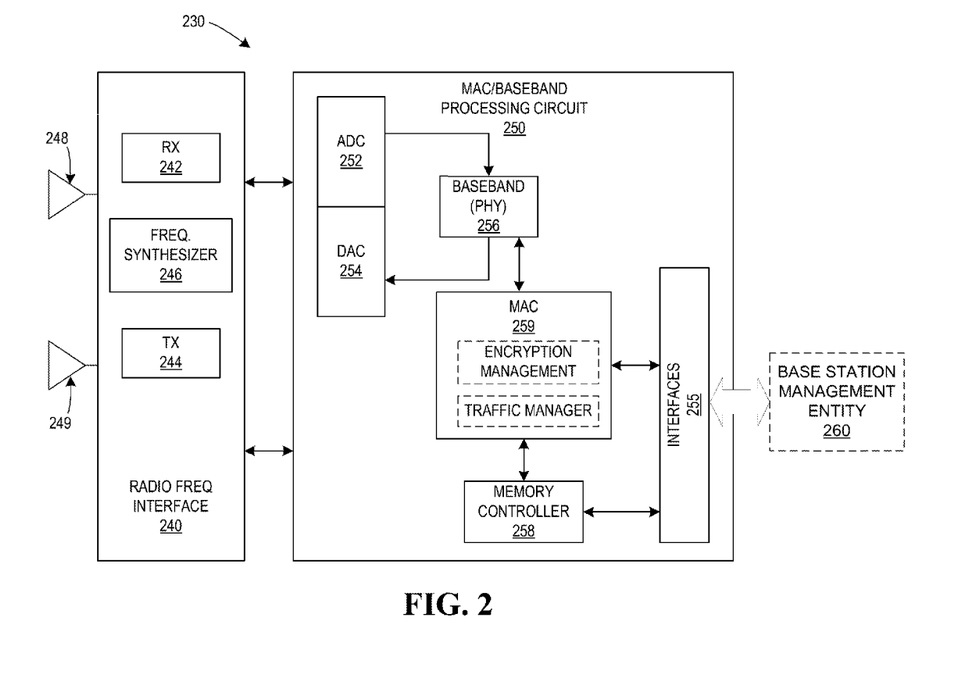
FIG. 2 is a schematic that illustrates an apparatus for use in the wireless network according to some embodiments.

Reference is made to FIG. 2, which schematically illustrates an apparatus 230 for use in the wireless network 100 according to embodiments of the invention. For example, apparatus 230 may be the MS 110 or BS 120 illustrated and described in reference to FIG. 1 for communicating with other MS 110 or BS 120 in a wireless network (e.g., wireless network 100 of FIG. 1). Apparatus 230 may include a controller or processing circuit 250 including logic (e.g., including hard circuitry, processor and software, or a combination thereof). In some embodiments, apparatus 230 may include a radio frequency (RF) interface 240 and/or a medium access controller (MAC)/baseband processing circuit 250.

In one embodiment, RF interface 240 may include a component or combination of components adapted for transmitting and/or receiving single carrier or multi-carrier modulated signals (e.g., including complementary code keying (CCK) and/or orthogonal frequency division multiplexing (OFDM) symbols) although the inventive embodiments are not limited to any specific over-the-air interface or modulation scheme. The RF interface 240 may include, for example, a receiver 242, a transmitter 244 and/or a frequency synthesizer 246. The RF interface 240 may include bias controls, a crystal oscillator and/or one or more antennas 248 and/or 249. In another embodiment, RF interface 240 may use external voltage-controlled oscillators (VCOs), surface acoustic wave filters, intermediate frequency (IF) filters and/or RF filters, as desired. Due to the variety of potential RF interface designs, an expansive description thereof is omitted.

The processing circuit 250 may communicate with the RF interface 240 to process, receive and/or transmit signals and may include, for example, an analog-to-digital converter 252 for down converting received signals, a digital-to-analog converter 254 for up converting signals for transmission. Further, the processing circuit 250 may include a baseband or physical layer (PHY) processing circuit 256 for PHY link layer processing of respective receive/transmit signals. Processing circuit 250 may also include, for example, a processing circuit 259 for medium access control (MAC)/data link layer processing. Processing circuit 250 may include a memory controller 258 for communicating with processing circuit 259 and/or a base station management entity 260, for example, via interfaces 255.

In some embodiments of the present invention, PHY processing circuit 256 may include a frame construction and/or detection module, in combination with additional circuitry such as a buffer memory, to construct and/or deconstruct super-frames. Alternatively or in addition, MAC processing circuit 259 may share processing for certain of these functions or perform these processes independent of PHY processing circuit 256. In some embodiments, MAC and PHY processing may be integrated into a single circuit if desired.

Apparatus 230 may be, for example, the MS 110 or BS 120 a hybrid coordinator, a wireless router, a NIC and/or network adaptor for computing devices or other device suitable to implement the inventive methods, protocols and/or architectures described herein. Accordingly, functions and/or specific configurations of apparatus 230 described herein, may be included or omitted in various embodiments of apparatus 230, as suitably desired. In some embodiments, the apparatus 230 may be configured to be compatible with protocols and frequencies associated one or more of the IEEE 802.11, 802.15 and/or 802.16 standards for WLANs, WPANs and/or broadband wireless networks, cited herein, although the embodiments are not limited in this respect.

Embodiments of apparatus 230 may be implemented using single input single output (SISO) architectures. However, as shown in FIG. 2, certain implementations may include multiple antennas (e.g., antennas 248 and 249) for transmission and/or reception using adaptive antenna techniques for beam-forming or spatial division multiple access (SDMA) and/or using MIMO communication techniques.

The components and features of apparatus 230 including a context retain timer may be implemented using any combination of discrete circuitry, application specific integrated circuits (ASICs), logic gates and/or single chip architectures. Further, the features of apparatus 230 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example apparatus 230 shown in the block diagram of FIG. 2 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

The BS 120 of FIG. 1 provides access for one or more Closed Subscriber Groups (CSG) and/or Open Subscriber Groups (OSG) of MS 110, wherein each CSG or OSG comprises one or more MS 110. In a CSG, access and services are restricted to authorized MS 110. In one embodiment, a CSG is a set of users authorized by a BS 120 subscriber and/or a NSP for the BS 120 to have reserved or privileged access to a service through the BS 120. The credentials or electronic certificates can be provided to the MS 110 by the cellular system operator at the time of subscription or at some later time. The BS 120 may have the knowledge (through MS 110 context generated following session setup) of the CSGs where the MS 110 may have access. The OSGs, on the other hand, are publicly accessible and no specific subscription is required. The MS 110 may still have to be authenticated by the operator's network to access an OSG.

During normal operation and as part of handover, the MS 110 can measure a received RF signal strength from a serving and neighboring BS 120 and select the most viable candidate base stations as target for handover. The measurements may be conducted on synchronization sequences that are unique to each BS 120 and further carry the Cell Identification (Cell_ID) or Physical Layer (PHY) level identifier. The cell type may also be communicated via the synchronization sequences if a hierarchical synchronization scheme is utilized. Since a number of bits that can be carried through the synchronization sequences are limited, additional information on the cell type and other configuration restrictions are broadcasted as part of system configuration information.

As an example, in some IEEE 802.16m embodiments, there are two stages of Downlink (DL) synchronization. The DL synchronization is achieved by successful acquisition of the primary advanced preamble. The primary advanced preamble carries information about base station type (e.g., macro BS or femto BS), system bandwidth (e.g., 5, 10, 20 MHz) and multi-carrier configuration (i.e., fully configured or partially configured RF carrier). Once the primary advanced preamble is detected, the MS 110 proceeds to acquisition of the secondary advanced preambles. The secondary advanced preamble carries a set of 768 distinct Cell_IDs that have been partitioned into a number of subsets where each subset corresponds to a certain type of base station (e.g., closed/open subscriber group femto base stations or macro base stations).

In some embodiments, the MS 110 may acquire the synchronization sequences, to detect the Cell_ID, followed by detection of the broadcast channel to complete the cell selection. If the MS 110 realizes that the cell is a non-accessible BS 120, it has to restart the cell search and select another cell. This effort would prolong the initial network entry/re-entry and handover and may involve a great number of unsuccessful trials.

Upon successful acquisition of system timing and cell identification, the MS 110 may attempt to detect and decode the system configuration information. This information is carried via the Superframe Headers (SFH) in some IEEE 802.16m embodiments. The superframe headers, comprising Primary and Secondary Superframe Headers (P-SFH and S-SFH), are control elements that are periodically (while a large part of this information remains unchanged over a long period of time, some parts may change more frequently) broadcasted using a robust and reliable transmission format to ensure the information can be correctly detected by all MSs 110 in the coverage area of a BS 120. The correct and timely detection of the system information is essential for successful network entry/re-entry and handover. The S-SFH content is divided into three sub-packets (SP1, SP2, and SP3) where sub-packets carry essential information for various system processes such as initial network entry, network re-entry, Idle-State operation, etc. according to their respective timing sensitivity.

Once the system parameters are successfully acquired, cell selection can be made taking certain considerations into account. For example, the MS 110 may have a preference in selecting a specific type of BS 120 (e.g., a femtocell in indoor environment) even though other types of the BS 120 may be available or the MS 110 may not be authorized to access a group of BSs 120 despite the fact that their received RF signal strength might be good.

Access State is a state where the MS 110 performs network entry to the selected or targeted BS 120. In some IEEE 802.16m embodiments, the Access State may comprise the following procedures: 1) Initial ranging and uplink synchronization, 2) Basic capability negotiation, 3) Authentication, authorization, and key exchange, and 4) Registration with the BS. The MS 110 receives specific user identification as part of Access State procedures. Ranging is a process of acquiring correct timing offset, frequency offset and power adjustments so that AMS transmissions are aligned with an ABS, and they are received within appropriate reception thresholds.

In a WiMAX wireless embodiment, such as in some IEEE 802.16m embodiments, a BSID of a BS 120 is 48 bits in length and the BSID is a unique MAC identifier to identify the BS 120. A common identifier that is used to indicate a CSG for a plurality of BS 120 may be a common m bit, wherein 48>m>25 most significant bits (MSB) of the plurality of BS 120. The $25^{th}$ bit is an indication of whether the MS 110 should obtain an addition NSP list from the network. In this embodiment, the first 24 bit MSB are assigned by IEEE as an operator identifier (OID).

Figure 3:
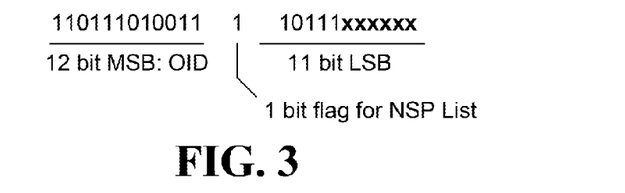
FIG. 3 is a diagram illustrating a string of bits used for CSG identification according to some embodiments.

In reference to FIG. 3, 24 bits of a BSID are illustrated as an embodiment for allocation of bits in a BSID structure. In this embodiment, a first operator or first network access provider (NAP) is assigned an OID of 110111010011 and provides a common identifier to represent a CSG for a plurality of BS 120. The first operator may reserve a BSID space of 110111010011-1-10111xxxxxx for this purpose, wherein the last six bits represented as (x) may be assigned or reserved to represent $2^6$=64 individual BSIDs from the plurality of BS 120 and each individual BS 120 is assigned an individual BSID. The first operator may provision a common identifier (110111010011-1-10111) in the MS 110 to identify BS 120, so that a MS 110 subscriber can identify a BS 120 that offers CSG access. The common identifier may be a number of bits used to represent a number of BS 120 that offers CSG access and the common identifier is equal to 24 bits in an embodiment. However, the common identifier may be less than 24 bits or greater than 24 bits in other embodiments. Further, the number of bits of the common identifier that are reserved for individual BS 120 may be selectively designed based on market, network, and/or system requirements.

The MS 110 can search and locate the common identifier in the MS 120 to determine whether BS 120 belongs to its CSG subscription and may select the BS 120 if the common identifier is detected and matches a corresponding common identifier provisioned in the MS 110. In an embodiment, the common identifier for the first operator represents a collection or group of femtocells such major airport hotspots.

In another embodiment, a second operator or second NAP is assigned an OID of 100100100111 and provides a second common identifier to represent a CSG for a second group of BS 120, wherein the second group of BS 120 comprises a plurality of BS 120. The second operator may reserve a BSID space of 100100100111-1-10xxxxxxxxx for this purpose, wherein 110111010011-1-10 is the common identifier and the last nine bits represented as (x) may be reserved and assigned to represent $2^9$=512 individual BSIDs. The second common identifier for the second operator may represent a collection or group of femtocells located in café shop hotspots provided by a second NAP.

The MS 110 may contain one or more lists of these common identifiers, each common identifier representing a corresponding set of accessible BS 120. It would be useful to reduce or minimize a number of identifiers stored and/or cached in the MS 110 to avoid the need to maintain a very large list of BSIDs. A reduced list of common identifiers such as a CSG white list can simplify the operation of the MS 110 and accelerate a cell selection procedure.

The MS 110 may also be configured to acquire and reference a NSP list when searching for authorized BS 120 and performing initial network entry. The NSP list and/or the CSG white list may be provisioned in the MS 110. The NSP list may be obtained from a BS 120 through a broadcast, as defined in IEEE 802.16e draft or in the IEEE 802.16m draft. In another embodiment, the NSP list is not provisioned in the MS 110 and/or NSP list acquisition from a BS 120 is mandatory. Obtaining the NSP list through a broadcast from the operator can be time consuming and inefficient.

Figure 4:
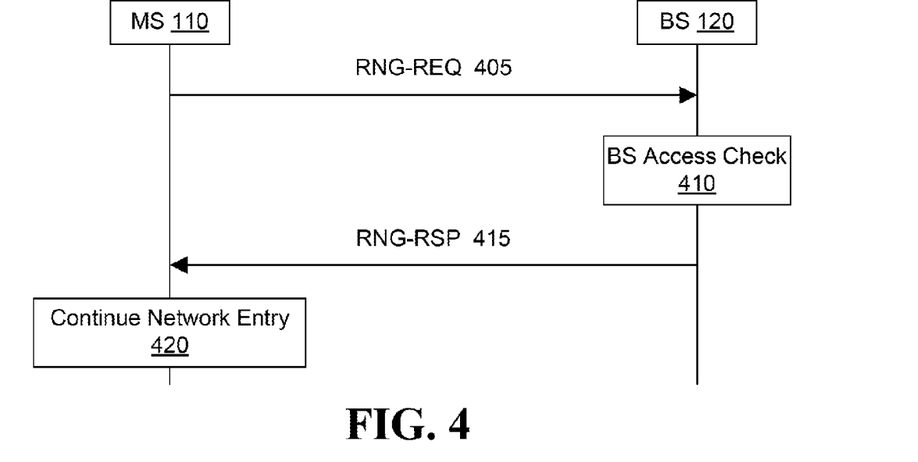
FIG. 4 is a diagram illustrating transfer of a network service provider list according to some embodiments.

FIG. 4 is a diagram illustrating transfer of a NSP list through unicast messaging according to some embodiments. Unicast messages exchanged between the MS 110 and the BS 120 are used to reduce resource waste and an amount of time spent by the MS 110 to obtain the NSP list or lists. In this embodiment, the MS 110 transmits a unicast message such as a range request (RNG-REQ) 405 signal to the BS 120 during initial ranging. The MS 110 may choose to begin ranging with a neighbor BS 120, even if it has not fully obtained a NSP list. The MS 110 may mark in the RNG-REQ 405, through the use of one or more bits, that it needs a NSP list to finalize cell selection. In alternate embodiments, the MS 110 transmits a unicast message such as a privacy key management (PKM) or a registration request (REG-REQ) message to the BS 120 to indicate that the MS 110 needs a NSP list to finalize cell selection The BS 120 performs a BS access check 410 to determine if the BS 120 is accessible by the MS 110. The BS 120 may provide access to the MS 110 through an OSG or the MS 110 may be a subscriber to a CSG provided by the BS 120. Access is granted to the MS 110 in this embodiment. In response, the BS 120 transmits the NSP list in or along with a range response (RNG-RSP) 315 message or a registration response (REG-RSP) message to the MS 110. The BS 120 allows network entry by the MS 110 and the MS 110 may decide to perform network entry 420 with the BS 120. The MS 110 may use the NSP list provided by the BS 120 to determine if the BS 120 is a preferred BS 120 to continue network entry.

Figure 5:
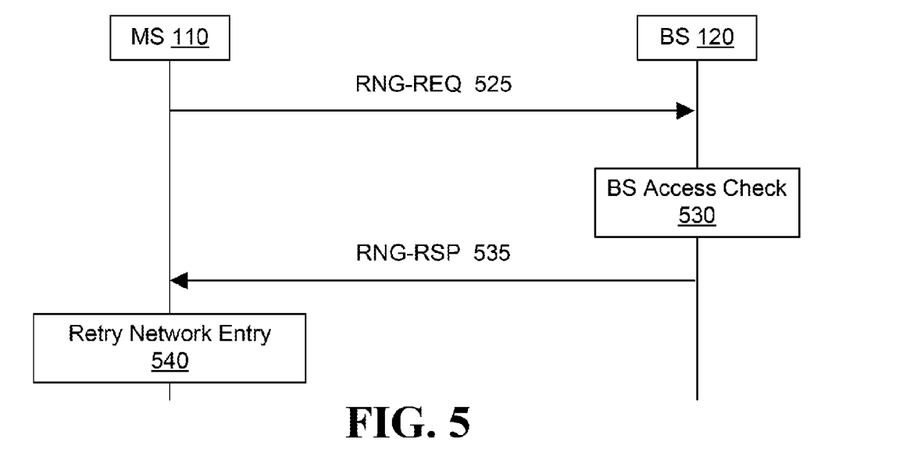
FIG. 5 is a diagram illustrating transfer of a network service provider list according to some embodiments.

FIG. 5 is a diagram illustrating transfer of a NSP list through unicast messaging according to some embodiments. In this embodiment, the MS 110 transmits a unicast message such as a RNG-REQ 525 signal to the BS 120 during initial ranging. The MS 110 may mark in the RNG-REQ 525 that it needs a NSP list to finalize cell selection. In alternate embodiments, the MS 110 transmits a unicast message such as a privacy key management (PKM) or a registration request (REG-REQ) message to the BS 120.

The BS 120 performs a BS access check 530 to determine if the BS 120 is accessible by the MS 110. The BS 120 may provide access to the MS 110 through an OSG or the MS 110 may be a subscriber to a CSG provided by the BS 120. Access is not granted to the MS 110 in this embodiment. In response, the BS 120 transmits one or more suggested BSIDs with associated preamble indexes and one or more NSP lists with a range response (RNG-RSP) 535 message or a registration response (REG-RSP) message to the MS 110. The MS 110 may decide to retry network entry 540 based on information provided in the RNG-RSP 535. As an alternative, the BS 120 may multicast the NSP list to a plurality of MS 110 in response to one or more requests for the NSP list.

In another embodiment, NSP list acquisition may be provided through an on-demand broadcast by a BS 120. The BS 120 may broadcast the information, for example, in response to any initial ranging by a MS 110 or a RNG-REQ 405 sent with a request for the NSP list. The BS 120 may choose to broadcast the NSP list in response to any initial ranging, PKM, or registration request so that a MS 110 attempting to initiate network entry will be able to promptly obtain the information. In this embodiment, the MS 110 is configured to listen for a broadcast message from the BS 120 in response to a unicast message sent from the BS 120.

Figure 6:
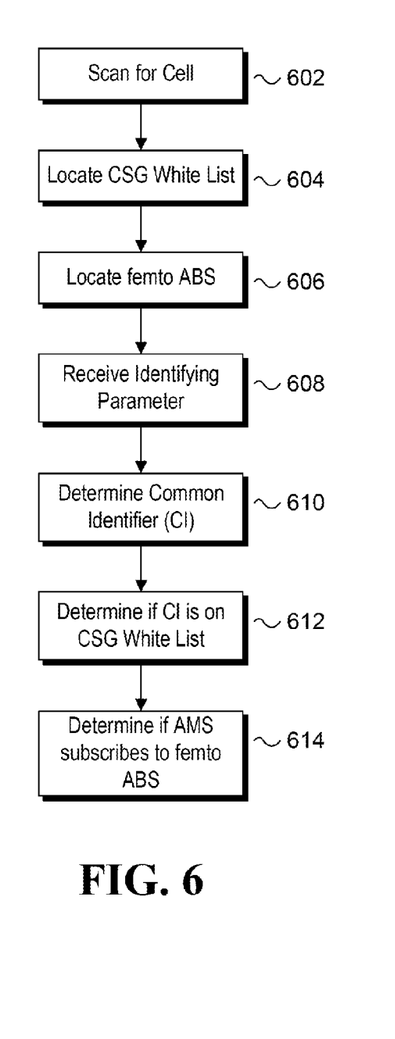
FIG. 6 is a diagram illustrating a method for initiating network entry according to some embodiments.

FIG. 6 is a diagram illustrating a method for initiating network entry by a MS 110 according to some embodiments. The method may be performed by the MS 110 such as the apparatus 230 comprising one or more antenna 248, 249, the RF interface 240, and the processing circuit 250 wherein the processing circuit 250 is configured to execute elements of the methods described in embodiments of the present invention.

A BS 120 may have been identified by the MS 110 as a result of scanning for one or more potential BS 120 in a cell, such as through initial ranging, as indicated in element 602. The MS 110 is seeking to initiate wireless communications with the BS 120 to determine if the MS 110 is a member of a CSG provided by the BS 120. The BS 120 is a femto ABS and the MS 110 is an AMS in an embodiment. The MS 110 may further synchronize with the BS 120, wherein synchronization includes performing downlink synchronization between the MS 110 and the BS 120.

The plurality of BS 120 configured to provide access to a CSG is identified using a common identifier, wherein the common identifier is listed on a CSG white list that is accessible to the MS 110. The CSG white list may comprise a plurality of common identifiers and may be provisioned on the MS 110, may be sent to the MS 110 through an over the air (OTA) transfer, or may be transferred to the MS 110 using a physical link. The MS 110 locates the CSG white list in element 604 by searching the MS 110 for a provisioned white list or a white list that has been transferred to the MS 110. The MS 110 locates the femto ABS or BS 120 in element 606 and receives an identifying parameter in element 608 from the femto ABS or BS 120. The identifying parameter may be a BSID, a bit string comprising the BSID, or another identifier sent by the BS 120 or femto ABS that is used by the MS 110 or AMS to derive a common identifier.

The MS 110 decodes or otherwise extracts a common identifier from the identifying parameter in element 610. The common identifier represents one or more BS 120 or femto ABS. In an embodiment where the identifying parameter is a BSID, the most significant bits of the BSID may be decoded to provide the common identifier. In another embodiment, a portion of the BSID is decoded or otherwise extracted to provide the common identifier. The MS 110 determines if the common identifier is on the CSG white list in element 612. The MS 110 determines if the MS 110 is a subscriber to a CSG provided by the femto ABS, such as by matching a common identifier from the BS 120 or femto ABS to a common identifier found on the CSG white list. The MS 110 may further perform network entry with the BS 120 if the MS 110 is a subscriber to a CSG provided by the BS 120. The MS 110 may scan for a second BS 120 without performing network entry with the first BS 120.

Figure 7:
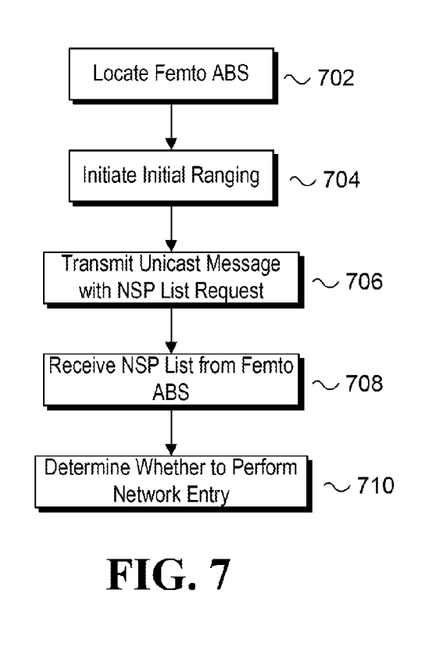
FIG. 7 is a diagram illustrating a method for initiating network entry according to some embodiments.

FIG. 7 is a diagram illustrating a method for initiating network entry by a MS 110 according to some embodiments. The MS 110, which may be an AMS, locates a BS 120 or a femto ABS in element 702 such as through scanning a wireless network 100. The femto ABS is a closed subscriber group (CSG) femto ABS in an embodiment. The MS 110 initiates initial ranging with the BS 120 in element 704 and transmits a first unicast message from the MS 110 to the BS 120 in element 706. The first unicast message is used to request a network service provider list (NSP) from the BS 120. The NSP list is received in element 708 from the BS 120 in or with a second unicast message. The MS 110 determines whether to perform network entry through the BS 120 using the NSP list in element 710 such as by determining if the MS 110 is a subscriber to the CSG provided by the BS 120. In an embodiment, the first unicast message is a range request (RNG-REQ) message and the second unicast message is a range response (RNG-RSP) message. Further, the MS 110 can use the NSP list and an identifying parameter received by the MS 110 to determine whether to perform network entry through the BS 120.

In an another embodiment, a MS 110 may determine to perform network entry to a cell using a method comprising receiving a list of common identifiers, wherein each common identifier represents a plurality of BS 120, locating a BS 120 in the cell, receiving a BSID from the BS 120, decoding the BSID to derive a common identifier, determining if the common identifier is on the list of common identifiers, transmitting a first unicast message to the BS 120, wherein the unicast message requests a network service provider (NSP) list, receiving the NSP list from the BS 120; and determining whether to perform network entry through the BS 120. The NSP list may be received in a broadcast message transmitted from the BS 120. In an embodiment, the base station is an ABS or eNB and the list of common identifiers is received by an AMS or UE. Further, the BS 120 is a femto ABS configured to provide access to the wireless network 100 through a CSG.

The operations discussed herein may be generally facilitated via execution of appropriate firmware or software embodied as code instructions on tangible media as applicable. Thus, embodiments of the invention may include sets of instructions executed on some form of processing core or otherwise implemented or realized upon or within a machine-readable medium. A machine-readable medium includes any mechanism for storing or transmitting information in a form readable by a machine (e.g., a computer). For example, a machine-readable medium can include an article of manufacture such as a read only memory (ROM); a random access memory (RAM); a magnetic disk storage media; an optical storage media; and a flash memory device, etc. In addition, a machine-readable medium may include propagated signals such as electrical, optical, acoustical or other form of propagated signals (e.g., carrier waves, infrared signals, digital signals, etc.).

While certain features of the invention have been illustrated and described herein, many modifications, substitutions, changes, and equivalents will now occur to those skilled in the art. It is, therefore, to be understood that the appended claims are intended to cover all such modifications and changes as fall within embodiments of the invention.

What is claimed is:

1. A method to initiate wireless communication by an advanced mobile station (AMS), comprising:

locating a closed subscriber group (CSG) white list in the AMS, the CSG white list comprising a list of one or more common identifiers each representing a corresponding set of base stations, each of the one or more common identifiers comprising common most significant bits (MSBs) of base station identifications (BSIDs) for its corresponding set of base stations;
locating a femto advanced base station (ABS);
receiving an identifying parameter of the femto ABS;
decoding the identifying parameter to derive a common identifier representing a plurality of femto ABSs;
determining if the common identifier representing the plurality of femto ABSs is on the CSG white list; and
determining if the AMS is a subscriber to the femto ABS.

2. The method of claim 1, further comprising synchronizing the AMS with the femto ABS.

3. The method of claim 1, wherein the identifying parameter is a base station identifier (BSID).

4. The method of claim 3, further comprising decoding the MSBs of the BSID.

5. The method of claim 1, further comprising performing network entry with the femto ABS if the AMS is a subscriber to a CSG provided by the femto ABS.

6. The method of claim 1, further comprising scanning for another femto ABS without performing network entry with the femto ABS.

7. A method to determine whether to perform network entry to a cell, comprising:
receiving a list of common identifiers, wherein each common identifier represents a corresponding plurality of base stations and comprises common most significant bits (MSBs) of base station identifiers (BSIDs) for its corresponding plurality of base stations;
locating a base station in the cell;
receiving a BSID from the base station;
decoding the BSID to derive a common identifier representing a plurality of base stations;
determining if the common identifier is on the list of common identifiers;
transmitting a first unicast message to the base station, wherein the unicast message requests a network service provider (NSP) list;
receiving the NSP list from the base station; and
determining whether to perform network entry through the base station.

8. The method of claim 7, wherein the NSP list is received in a broadcast message from the base station.

9. The method of claim 7, wherein the base station is an enhanced node B (eNB) and the list of common identifiers is received by a user equipment (UE).

10. The method of claim 7, wherein the base station provides access to the network through a closed subscriber group (CSG).

11. A system for initiating network entry, comprising:
an antenna;
a radio frequency (RF) interface configured to receive an identifying parameter from a femto advanced base station (ABS); and
processing circuitry configured to:
locate a closed subscriber group (CSG) white list comprising a plurality of common identifiers each representing a corresponding set of base stations, each of the one or more common identifiers comprising common most significant bits (MSBs) of base station identifications (BSIDs) for its corresponding set of base stations;
decode the identifying parameter to derive a common identifier representing a plurality of femto ABSs;
determine if the common identifier representing the plurality of femto ABSs is on the CSG white list; and
determine if the system is a subscriber to the femto ABS.

12. The system of claim 11, wherein the RF interface is further configured to transmit a first unicast message to the femto ABS, wherein the first unicast message requests a network service provider (NSP) list from the femto ABS.

13. The system of claim 12, wherein the RF interface is further configured to receive the NSP list through a second unicast message from the femto ABS.

14. The system of claim 13, wherein the first unicast message is a range request (RNG-REQ) message and the second unicast message is a range response (RNG-RSP) message.

15. The system of claim 14, wherein the processing circuitry uses the NSP list and the first common identifier to determine whether to perform network entry through the femto ABS.

16. A method for providing network entry to a closed subscriber group (CSG) femto advanced base station (ABS) comprising transmitting an identifying parameter to an advanced mobile station (AMS), wherein the identifying parameter comprises a common identifier to represent a plurality of femto ABS, and receiving a request from the AMS to initiate network entry if the common identifier is located on a CSG white list in the AMS, the CSG white list comprising a list of one or more common identifiers each representing a corresponding set of base stations, each of the one or more common identifiers comprising common most significant bits (MSBs) of base station identification (BSIDs) for its corresponding set of base stations.

17. The method of claim 16, further comprising receiving a unicast message from the AMS, wherein the unicast message requests a network service provider (NSP) list.

18. The method of claim 17, further comprising transmitting the NSP list to the AMS.

* * * * *